Jan. 25, 1949.  J. F. SEBALD  2,460,036
WATER TREATING APPARATUS
Filed Aug. 3, 1946  3 Sheets-Sheet 1

Joseph F. Sebald
Inventor

Joseph F. Sebald
Inventor

Jan. 25, 1949. J. F. SEBALD 2,460,036
WATER TREATING APPARATUS
Filed Aug. 3, 1946 3 Sheets-Sheet 3

INVENTOR
JOSEPH F. SEBALD
BY
ATTORNEY

Patented Jan. 25, 1949

2,460,036

UNITED STATES PATENT OFFICE 2,460,036

WATER TREATING APPARATUS

Joseph F. Sebald, Bloomfield, N. J., assignor to Worthington Pump and Machinery Corporation, Harrison, N. J., a corporation of Delaware Application August 3, 1946, Serial No. 688,249

7 Claims. (Cl. 210—24)

This invention relates to water treating apparatus and more particularly to pressure filters for water purification such as are commonly known in the trade as zeolite water softeners.

More particularly the present invention relates to a method and apparatus for regenerating zeolite water softeners.

An object of the invention is to provide a method and apparatus for regeneration of zeolite water softeners which will very materially reduce the length of time and the quantity of water required in the regeneration operation, and thus not only reduce the cost of such operation but will reduce the "off the line" time of the softener.

With these and other objects in view, as may appear from the accompanying specification, the invention consists of various features of construction and combination of parts, which will be first described in connection with the accompanying drawings, showing a water treating apparatus of a preferred form embodying the invention, and the features forming the invention will be specifically pointed out in the claims.

Figure 1:
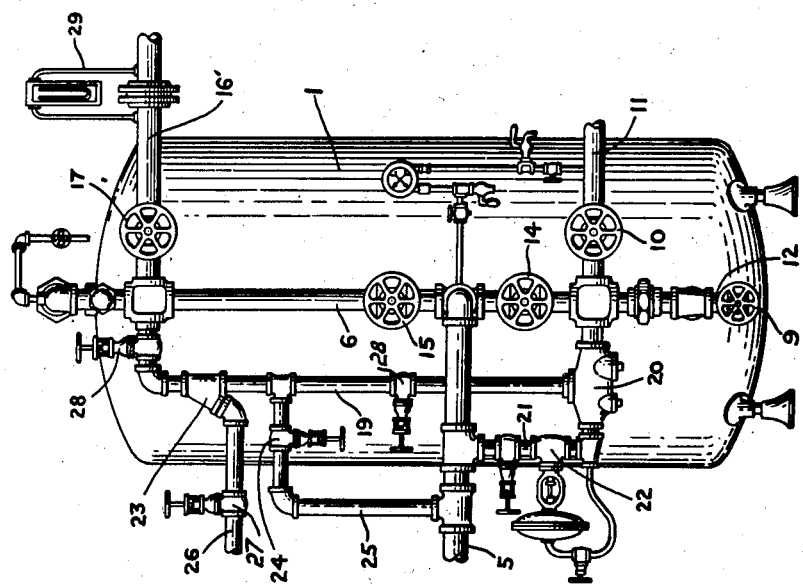
Figure 1 is a side elevation of a zeolite pressure filter water softener of the present invention.
Figure 2:
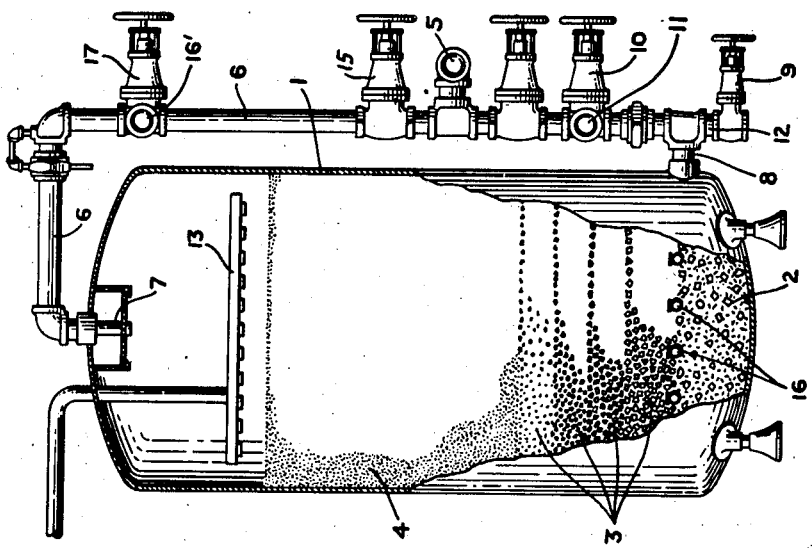
Figure 2 is a vertical section through the water softener.

Referring more specifically to the drawings the water softener shown in Figures 1 and 2 of the drawings embodies a tank or receptacle 1 which has a foundation bed 2 therein upon which rests a plurality of beds 3 of relatively coarse material gradually decreasing in grain size to the topmost layer. The zeolite bed 4 is above and rests upon the uppermost layer or bed 3, as clearly shown in Figure 2 of the drawings.

In normal water treating operation the water to be treated enters through the inlet pipe 5, passes upwardly through the pipe 6 and downwardly into the tank or receptacle 1 through the outlet 7. After the water filters through the zeolite bed 4 and the succeeding beds 3 it passes from the tank 1 through the outlet pipe 8 and when the valve 9 is closed and the valve 10 is open passes out through the pipe 11 to service, or the point where it is to be used. The down pipe 12 in which the valve 9 is located leads to waste, and is used in the method of regeneration of the softener which has been standard practice up to the present invention.

The present invention comprehends the method or regeneration of the softener by hydraulically expanding the filter bed and this is done by washing the zeolite bed 4 with the flow of cleaning water in an upward direction and to bleed off to waste an amount of rinse water equal to that which is supplied from the service line 5 and further to recirculate an additional amount of rinse water through the filter or zeolite bed by means of a water jet eductor or pump.

Brine acid or other suitable chemical reagent for regenerating the filter bed is delivered into the upper part of the receptacle or tank 1 above the zeolite bed 4 through a spray device 13 and after treatment of the filter bed by the brine or suitable chemical, it (the brine) is washed from the particles which form the filter bed by rinsing water which is directed from the inlet pipe 5 downwardly through the pipe 6 when the valve 14 is open and the valves 9, 10 and 15 are closed, through the spray heads 16 which in normal operation form the service underdrain system through which the treated water drains for passage through the pipe 11 to service. The water passing upwardly through the filter bed hydraulically expands the bed to permit greater access of the water to the particles making up the beds 3 and 4.

The water flows upwardly through the beds 3 and 4 and out through the normal inlet 7 into the pipe 6 and out to waste through the waste pipe 16' when the valve 17 therein is open.

Prior to the treatment of the filter bed by brine the bed is backwashed by flow of washing water in the manner just above described, and after treatment of the bed by brine, the brine is washed from the bed as stated.

Part of the rinse water which flows out through the pipe 6 passes into a recirculating pipe 19 to an eductor 20, the motive power of which is provided by incoming water through the inlet 5. The motive water of the eductor 20 is delivered thereto through a branch pipe 21 in which is positioned a pressure actuated valve structure 22. The eductor 20 and the pressure actuated valve structure 22 may be of any approved type which can be purchased on the open market, and which are well known to those familiar with the treatment of water. The pressure actuated valve structure 22 acts to maintain constant pressure of motive water on the eductor, to regulate the rate of recirculation of water through the filter beds 3 and 4.

A strainer 23 is located in the recirculating pipe 19 to strain out any fine particles of the zeolite bed 4 which may be carried over with the outgoing water. When the strainer becomes clogged to a sufficient degree to lower the pressure of water flowing through the pipe 19, to a degree lower than the pressure of water in the pipe 5, the manually actuated valve 24 when opened in the branch pipe 25 will allow water to flow through the branch or bypass line 25 in reverse direction through the strainer 23 and off to waste through the waste pipe 26. The valve 27 in the waste pipe 26 and the valve 28 in the recirculating pipe 19, both of which are manually operated gate valves will prevent the normal flow of water through the waste pipe 26 and the reverse flow of water through the recirculating pipe 19 respectively.

A flow indicator 29 is connected in the waste pipe 16 to show the rate of back wash or rinsing flow of water through the apparatus, so that by adjustment of the valves 14 and 17 the flow may be regulated to the desired degree. The flow indicator may be any one of a number of such devices which can be purchased on the open market and merely shows the rate of flow of water through the pipe 16.

With the method and apparatus now commonly employed to regulate zeolite softeners, and which is at present considered standard, it requires on an average 130 minutes and 14,300 gallons of water to regenerate an apparatus of approximately 150 gallons per minute capacity using a resinous type of zeolite while with the method and apparatus of the present invention the same apparatus may be regenerated in from 65 to 75 minutes with a consumption of approximately 7200 gallons of water, thus saving considerable time and water with the resultant money savings.

Figure 5:
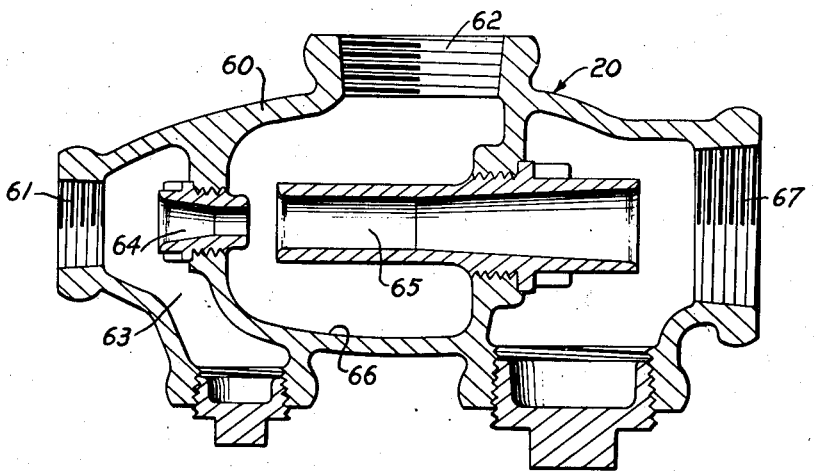
Figure 5 is a cross section through the eductor employed in the water treating apparatus.

The eductor structure 20 may be of any approved type which may be purchased upon the open market, and one form of such eductor is illustrated in section in Figure 5 of the drawings. The eductor 20 comprises the housing 60 having an inlet 61 for the motive fluid and an inlet 62 for the fluid to be pumped, i. e., the fluid recirculated. The motive fluid enters the chamber 63 through the inlet 61 and passes through the nozzle 64 into the inlet of the nozzle 65. The pressure and velocity of the water leaving the nozzle 64 will cause a suction action in the chamber 66 and will pick up some of the water which enters the chamber 66 through the inlet 62. The mixed motive fluid water and recirculated water will pass through the nozzle 65 and out of the outlet 67 of the eductor.

Figure 6:
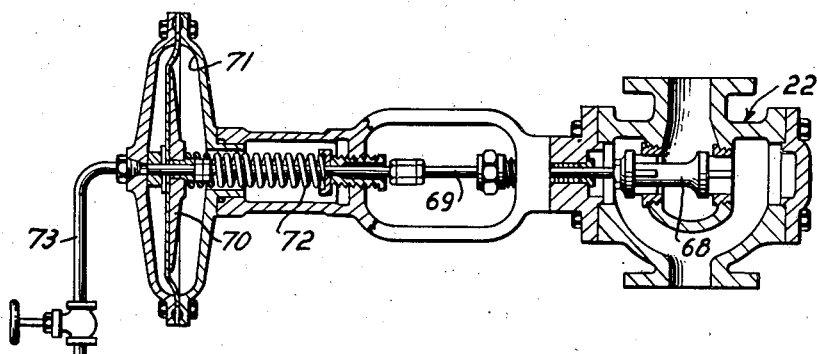
Figure 6 is a longitudinal section through the pressure actuated valve for controlling the pressure of the motive fluid water of the eductor.

The pressure actuated valve structure 22 also may be of any approved type and may be purchased upon the open market, and one form of such pressure actuated valve is shown in section in Figure 6 of the drawings. In this construction, the quantity of water delivered to the inlet 61 of the eductor is controlled by the dual seated valve element 68. The valve unit 68 has a valve stem 69 connected thereto, the outer end of which is connected to a diaphragm 70 extending across a sealed housing 71. A spring 72 urges the valve unit 68 off its seat to open the valve. A by-pass pressure line 73 is connected to the inlet 61 of the eductor and opens into the sealed housing 71 on the outer side of the diaphragm 70 so that pressure fluid entering the casing 71 from the inlet of the eductor 20 will move the diaphragm against the tension of the spring 72 to move the valve unit 68 towards its seat and regulate the quantity and pressure of water delivered to the eductor by the pressure of the water at the suction or inlet of the eductor 20.

Figure 3:
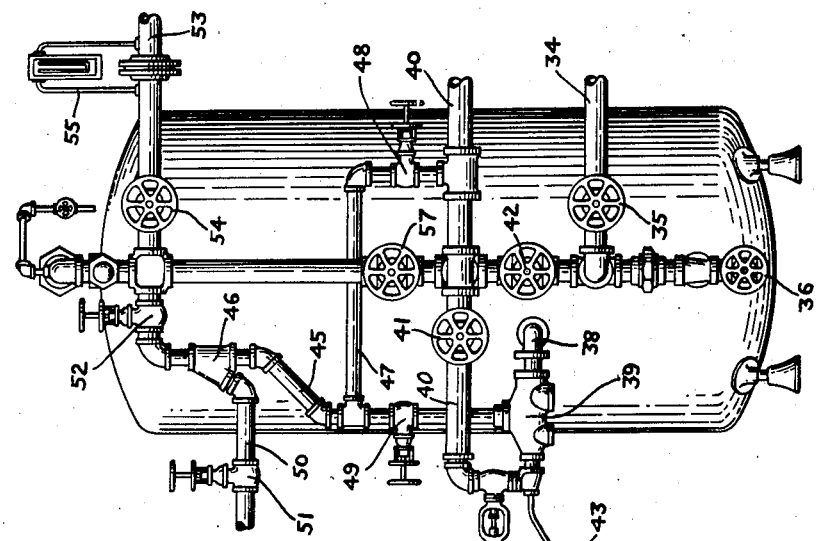
Figure 3 is a side elevation of a modified form of the water softener or water treating apparatus.
Figure 4:
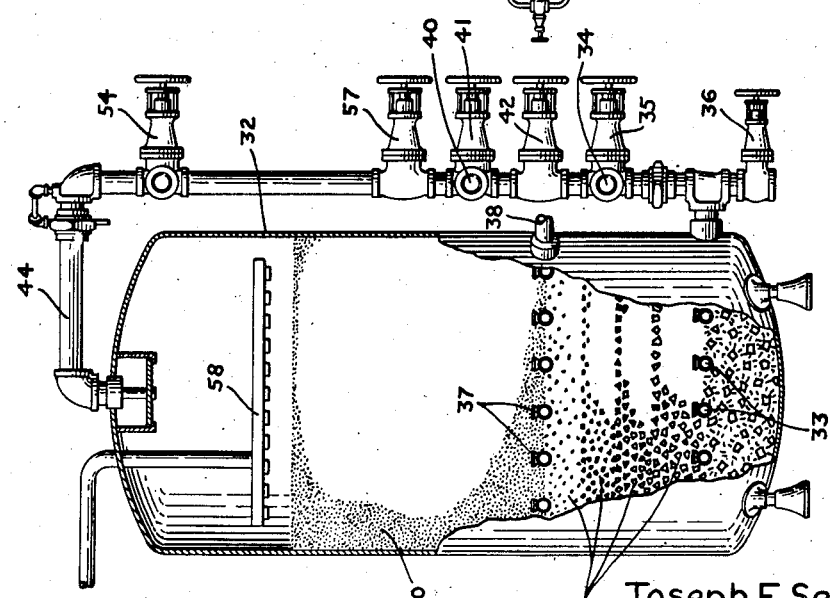
Figure 4 is a vertical section through the apparatus shown in Figure 3.

Figures 3 and 4 of the drawings show a modification of the apparatus shown in Figures 1 and 2 of the drawings, the method of regenerating the filter bed is the same as the method employed in connection with the apparatus shown in Figures 1 and 2.

In Figures 3 and 4 the zeolite softening or filtering bed rests upon the granular supporting beds 31 within the tank or receptacle 32, and this structure differs from the structure shown in Figures 1 and 2 in that a back wash and rinsing drain system is located above the service underdrain system indicated at 33 through which the treated water flows to the pipe 34 when the valve 35 is open and the drain valve 36 is closed.

The back wash and rinse under drain system is located at the top of the bed 31 and the bottom of the zeolite bed 30 and like the service underdrain system includes a plurality of nozzles 37 which receive back washing or rinse water from a pipe 38 during either back washing or rinsing operation of the apparatus. The pipe 38 forms the outlet for an eductor 39. Like the eductor 20, the eductor 39 is of any approved type which can be purchased upon the open market and uses fluid under pressure as its motive power to pump other liquid. If it is so desired any suitable type of pump may be employed instead of eductors as shown.

The eductor 39 receives its motive fluid from the inlet pipe 40 of the apparatus when the valve 41 is open and the valve 42 closed. The pressure of the motive water entering the eductor 39 is regulated by the pressure actuated valve structure 43, which is the same as the pressure actuated valve structure 22 and operates in the same manner.

The eductor draws recirculating back wash or rinse water from the pipe 40, which is the normal inlet for water to be treated but acts as the outlet for the back wash or rinse water, through the recirculating pipe 45.

The recirculating pipe 45 has a strainer 46 of any approved type therein to strain out any small particles of zeolite which may be carried over by the back wash or rinse water. The cleaning of the strainer 46 is effected by pressure drop in the pipe 45 due to clogging of the strainer by a reverse flow of water through the strainer through the pipe 47 under control of the pressure valves 48 and 49 and out through the waste pipe 50 under control of the pressure valves 51 and 52. These pressure valves 48, 49, 51, and 52 are the ordinary type of manually operated gate valve.

The back wash or rinse water flows to waste through the waste pipe 53 when the valve 54 is open and a flow indicator 55 is connected in the waste pipe 53 and functions the same as the flow indicator 29 shown in Figure 1 of the drawings.

During either back wash or rinse operation the valves 42 and 57 in the inlet pipe 44 are closed, while during both the back wash and rinsing operations the valves 41, 42, and 54 are open. The valves 41 and 54 are closed and the valves 35 and 57 open during normal water treating operation of the apparatus, as is also the valve 35.

The apparatus shown in Figures 3 and 4 of the drawings is provided with means indicated at 58 for delivering a regenerating brine to the apparatus.

It will be understood that the invention is not to be limited to the specific construction or arrangement of parts shown, but that they may be widely modified within the invention defined by the claims.

What is claimed is:

1. In a water treating apparatus, a receptacle having a zeolite filtering bed therein, an inlet pipe on one side of said said zeolite bed for delivering water to be treated to said receptacle, an outlet pipe for treated water on the other side of said zeolite bed, a connecting pipe connecting said inlet and outlet pipes, a valve in said connecting pipe, a valve in said outlet pipe, said valves operable to direct water from said inlet pipe through said outlet pipe and into and through said zeolite bed in a reverse directional flow to the water treating flow of water through the receptacle to hydraulically expand said zeolite filtering bed, and outlet means connected to said receptacle for outlet of the water directed through the said receptacle in the reverse direction, a recirculating pipe connected to said inlet pipe and to said outlet pipe and means for recirculating through the recirculating pipe and the zeolite bed fluid passed in the reverse direction and from the outlet pipe.

2. A water treating apparatus as claimed in claim 1 wherein the last-named means in claim 1 includes a pump connected in said recirculating pipe, and pressure actuated means for controlling operation of said pump.

3. A water treating apparatus as claimed in claim 1 including a strainer in said recirculating pipe, a by-pass pipe connected to said inlet pipe and said recirculating pipe to direct water from the inlet pipe through the strainer in a back-flow washing direction.

4. A water treating apparatus as claimed in claim 1 wherein the last-named means of claim 1 includes an eductor pump having its inlet connected to said inlet pipe and its outlet connected to said outlet pipe for drawing some of the water from the inlet pipe after its reverse passage through said zeolite bed and returning it to the outlet pipe for reverse circulation through the zeolite bed.

5. A water treating apparatus as claimed in claim 1 wherein the last-named means of claim 1 includes an eductor pump having its inlet connected to said inlet pipe and its outlet connected to said outlet pipe for drawing some of the water from the inlet pipe after its reverse passage through said zeolite bed and returning it to the outlet pipe for reverse circulation through the zeolite bed, a branch pipe connecting said eductor pipe to the inlet pipe in advance of said connecting pipe for directing some of the incoming water to the eductor pump for action as motive fluid for the pump.

6. A water treating apparatus as claimed in claim 1 wherein the last-named means of claim 1 includes an eductor pump having its inlet connected to said inlet pipe and its outlet connected to said outlet pipe for drawing some of the water from the inlet pipe after its reverse passage through said zeolite bed and returning it to the outlet pipe for reverse circulation through the zeolite bed, a branch pipe connecting said eductor pipe to the inlet pipe in advance of said connecting pipe for directing some of the incoming water to the eductor pump for action as motive fluid for the pump, and means operated by pressure of the incoming water for regulating the quantity of water delivered to said eductor pump through said branch pipe.

7. A water treating apparatus as claimed in claim 1 including an eductor pump connected in said recirculating pipe and having its motive fluid inlet connected to said inlet pipe and its outlet connected to said outlet pipe for drawing some of the water from the inlet pipe as motive fluid for recirculating through the zeolite bed part of the fluid passed therethrough in a reverse direction, a strainer in said recirculating pipe, a by-pass pipe connected to said inlet pipe and said recirculating pipe between said strainer and said eductor pump to direct water directly from the inlet pipe through the strainer in a back-flow washing direction.

JOSEPH F. SEBALD.

REFERENCES CITED

The following references are of record in the file of this patent:

UNITED STATES PATENTS

| Number | Name | Date |
| --- | --- | --- |
| 1,276,629 | Duggan | Aug. 20, 1918 |
| 1,696,369 | Trewhitt et al. | Dec. 25, 1928 |
| 1,759,601 | Apeldorn | May 20, 1930 |
| 1,775,412 | Tannehill | Sept. 9, 1930 |
| 1,980,161 | Applebaum | Nov. 13, 1934 |
| 2,000,696 | Friend et al. | May 7, 1935 |
| 2,092,716 | Hungerford et al. | Sept. 7, 1937 |
| 2,365,221 | Shafor | Dec. 19, 1944 |
| 2,412,328 | Felsecker | Dec. 10, 1946 |

FOREIGN PATENTS

| Number | Country | Date |
| --- | --- | --- |
| 224,656 | Great Britain | Nov. 20, 1924 |